Patented Aug. 30, 1932

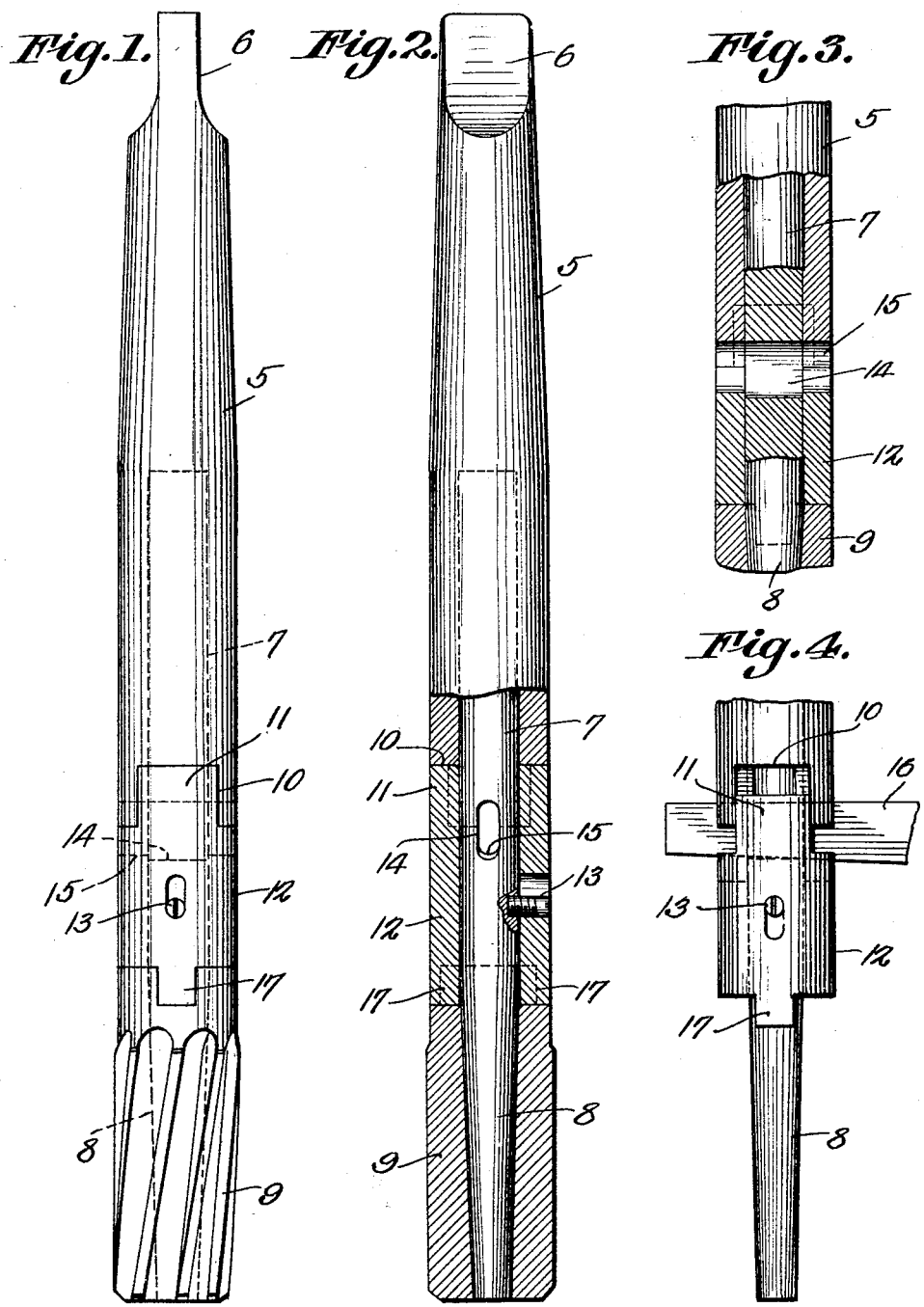

1,874,441

UNITED STATES PATENT OFFICE

RICHARD T. BUTLER, OF MINDEN, LOUISIANA

ARBOR FOR SHELL REAMERS

Application filed October 7, 1929. Serial No. 398,030.

This invention relates to arbors for shell reamers or drills, the primary object of the invention being to provide a reamer having novel means whereby the tool may be readily and easily disconnected therefrom, eliminating the necessity of hammering or hitting the tool to disconnect the tool.

Another object of the invention is to provide a drill arbor including a movable sleeve against which the tool engages when fitted on the arbor, the sleeve being provided with an opening registering with an opening formed in the arbor, which openings are designed to receive a tapered key which is driven into the openings of the arbor and sleeve, to force the sleeve longitudinally of the arbor to remove the tool.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view of an arbor constructed in accordance with the invention.

Figure 2 is a view of an arbor, a portion being shown in section.

Figure 3 is a fragmental longitudinal sectional view thereof.

Figure 4 is a fragmental elevational view illustrating the key as positioned in the opening to unseat the tool.

Referring to the drawing in detail, the arbor is indicated generally by the reference character 5, the same being provided with a reduced end portion 6 to permit it to be fitted in a lathe stock, drill brace, or the like.

The arbor includes a shank 7 that is formed with a tapered extremity 8 on which the tool, which in the present showing is indicated by the reference character 9, is positioned, the tool being provided with a tapered bore to insure a close fit between the shank and tool, to lock the tool in position.

The arbor is formed with cut out portions 10 to receive the prongs 11 formed on opposite sides of the sleeve 12, which sleeve is slidably mounted on the shank 7, as clearly shown by Figure 2 of the drawing, there being provided a set screw 13 passing through an elongated opening of the sleeve 12, and having connection with the shank 7, to restrict movement of the sleeve longitudinally of the shank.

An opening 14 is formed in the shank, which opening communicates with the opening 15 of the sleeve, the opening 15 being slightly smaller than the opening 14. The registering openings 14 and 15 are designed to receive the key 16 which is tapered, to the end that when the key 16 is driven into the registering openings, the key will engage the edges of the opening 15 that extend above the bottom of the opening 14, forcing the sleeve longitudinally of the arbor, when the key is struck by a suitable tool, such as a hammer. Thus it will be seen that as the sleeve is moved longitudinally of the arbor, the tool moves therewith, causing the tool to become disconnected from the tapered extremity 8 of the arbor.

Extensions 17 are formed on the opposite end of the sleeve, and pass into openings formed in the inner edge of the tool, to lock the sleeve and tool together.

From the foregoing it will be obvious that due to this construction, the tool may be readily and easily disconnected from the arbor, by merely inserting the key into the registering openings of the shank and sleeve, and striking the key to force the key through the openings, the tapered edge of the key moving against the sleeve to force the sleeve and tool longitudinally of the shank 7.

I claim:

An arbor comprising a body portion having a bore, a tapered shank extending into the bore, said body portion having cut out portions formed in one edge thereof, defining fingers, a sleeve mounted on the shank and having cut away portions at its ends providing extensions, a tool fitted on the tapered portion of the shank and having cut out portions to receive the extensions at one end of the sleeve, said sleeve having an elongated opening, a screw disposed within the elongated opening and secured in the shank, said sleeve having cut out portions disposed between the extensions at one end of the sleeve, said shank having an opening registering with the last mentioned cut out portions, said registering openings of the shank and sleeve adapted to receive a key to wedge the sleeve and tool longitudinally of the shank to disconnect the tool from the shank, and the peripheries of the body portion, sleeve and tool being flush.

In testimony that I claim the foregoing as my own, I have hereto affixed my signature.

RICHARD T. BUTLER.